United States Patent
Keeney et al.

(10) Patent No.: US 9,428,016 B2
(45) Date of Patent: Aug. 30, 2016

(54) TIRE INFLATION SYSTEM WITH AXLE DRIVEN PUMP

(71) Applicant: ArvinMeritor Technology, LLC, Troy, MI (US)

(72) Inventors: Christopher Keeney, Troy, MI (US); George Walrath, Boise, ID (US); Michael Andrew Power, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 483 days.

(21) Appl. No.: 14/052,230

(22) Filed: Oct. 11, 2013

(65) Prior Publication Data
US 2015/0101723 A1 Apr. 16, 2015

(51) Int. Cl.
*B60C 23/10* (2006.01)
*B60C 23/12* (2006.01)

(52) U.S. Cl.
CPC ..................... *B60C 23/12* (2013.01)

(58) Field of Classification Search
CPC ..... B60C 23/10; B60C 23/12; B60C 23/004; B62K 19/42
USPC ................................. 152/419, 421
See application file for complete search history.

(56) References Cited

U.S. PATENT DOCUMENTS

| | | | | |
|---|---|---|---|---|
| 664,281 | A * | 12/1900 | Loebinger | B60C 23/12 152/421 |
| 758,058 | A * | 4/1904 | Geisler | B60C 23/12 152/421 |
| 789,024 | A * | 5/1905 | Hibbard et al. | B60C 23/12 152/421 |
| 797,447 | A * | 8/1905 | Merry | B62K 19/42 152/421 |
| 6,994,136 | B2 * | 2/2006 | Stanczak | B60C 23/12 152/418 |
| 7,690,412 | B1 | 4/2010 | Jenkinson et al. | |
| 7,926,530 | B2 * | 4/2011 | Isono | B60C 23/12 152/419 |
| 7,931,061 | B2 | 4/2011 | Gonska et al. | |
| 8,616,254 | B2 | 12/2013 | Kelley et al. | |
| 2012/0186714 | A1 | 7/2012 | Richardson | |
| 2012/0234447 | A1 | 9/2012 | Narloch et al. | |
| 2015/0059947 | A1 * | 3/2015 | Power | B60C 23/12 152/419 |

OTHER PUBLICATIONS

Meritor an ArvinMeritor brand, Meritor Tire Inflation System (MTIS) by PSI(TM), including Mentor ThermALERT (TM), PB-9999, Revised May 2007.

* cited by examiner

*Primary Examiner* — Jason Bellinger
(74) *Attorney, Agent, or Firm* — Brooks Kushman P.C.

(57) ABSTRACT

A tire inflation system having a spindle, a pump actuating member, and a pump. The pump actuating member may actuate the pump when the pump rotates about an axis, thereby causing the pump to output a pressurized gas.

20 Claims, 2 Drawing Sheets

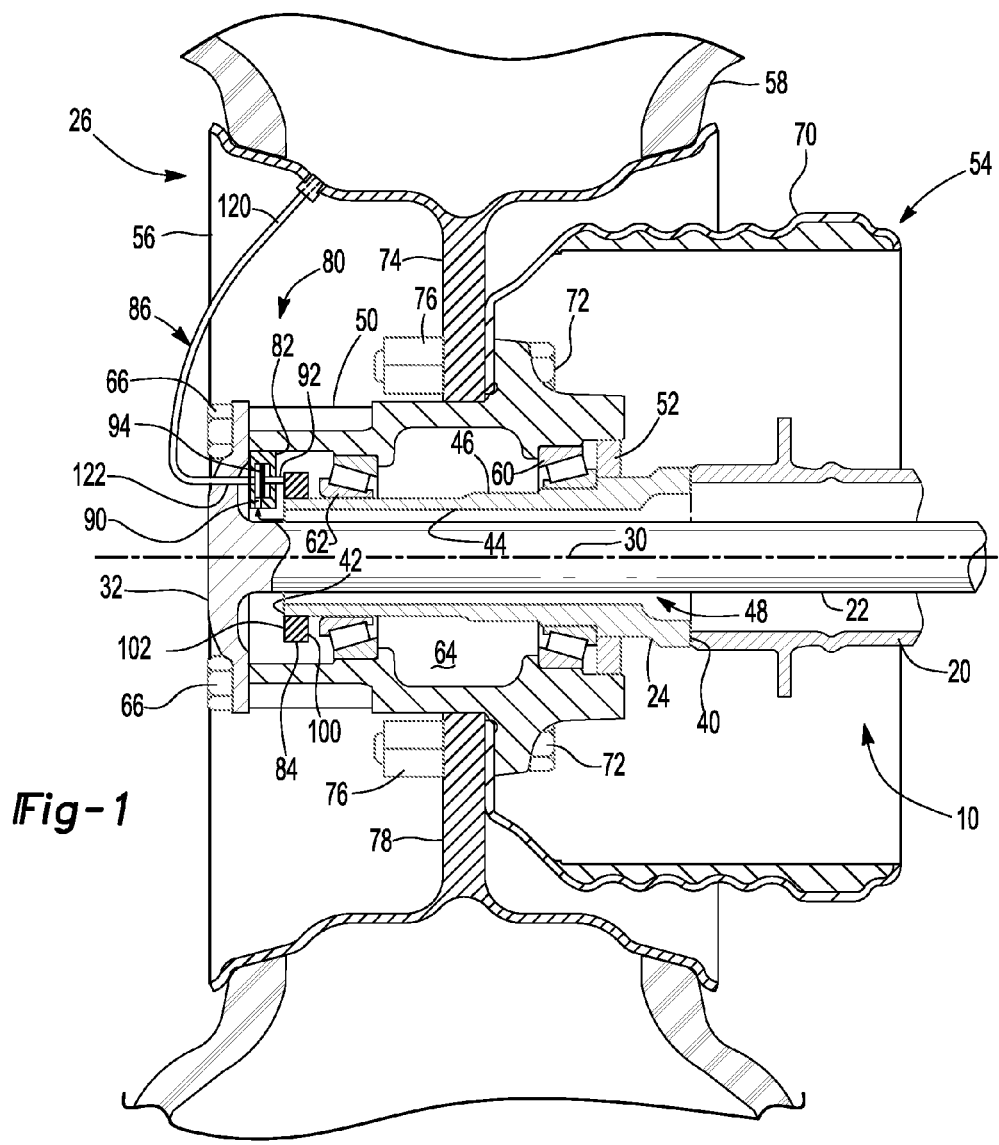
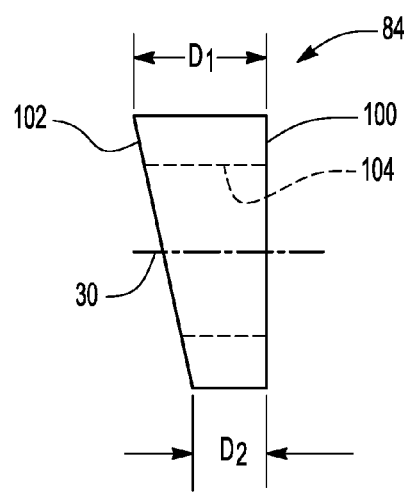

TIRE INFLATION SYSTEM WITH AXLE DRIVEN PUMP

TECHNICAL FIELD

This patent application relates to a tire inflation system having an axle driven pump.

BACKGROUND

An automatic tire inflation system is disclosed in U.S. Patent Publication No. 2012/0234447.

SUMMARY

In at least one embodiment, a tire inflation system is provided. The tire inflation system may include a spindle, a wheel end assembly, a pump actuating member, a pump, and a conduit. The spindle may extend along an axis. The wheel end assembly may be rotatably disposed on the spindle and may be configured to rotate about an axis with respect to the spindle. The pump actuating member may be disposed proximate the spindle. The pump may rotate about the axis with the wheel end assembly. The pump actuating member may actuate the pump when the pump rotates about the axis, thereby causing the pump to output a pressurized gas. The conduit may supply pressurized gas from the pump to a tire.

In at least one embodiment, a tire inflation system is provided. The tire inflation system may include a spindle, an axle shaft, a pump actuating member, a pump, and a conduit. The axle shaft may extend through a hole in the spindle and may be configured to rotate about an axis with respect to the spindle. The axle shaft may include an axle flange that may be disposed proximate a distal end of the axle shaft. The pump actuating member may be fixedly disposed on the spindle and may extend around the spindle. The pump may be disposed proximate the axle flange and may rotate about the axis with the axle shaft. The pump actuating member may actuate the pump when the pump rotates about the axis, thereby causing the pump to output a pressurized gas. The conduit may supply pressurized gas from the pump to a tire.

In at least one embodiment a tire inflation system is provided. The tire inflation system may include a spindle, a hub, a pump actuating member, a pump, and a conduit. The spindle may extend along an axis. The hub may be rotatably disposed on the spindle and may be configured to rotate about the axis. The pump actuating member may be fixedly disposed on the spindle and may extend around the spindle. The pump may be disposed proximate the hub and may rotate about the axis with the hub. The pump actuating member may actuate the pump when the pump rotates about the axis, thereby causing the pump to output a pressurized gas. The conduit may supply pressurized gas from the pump to a tire.

BRIEF DESCRIPTION OF THE DRAWINGS

FIG. 1 is a section view of an exemplary wheel end assembly having a tire inflation system.

FIG. 2 is a side view of a pump actuating member shown in FIG. 1.

DETAILED DESCRIPTION

Figure 3:
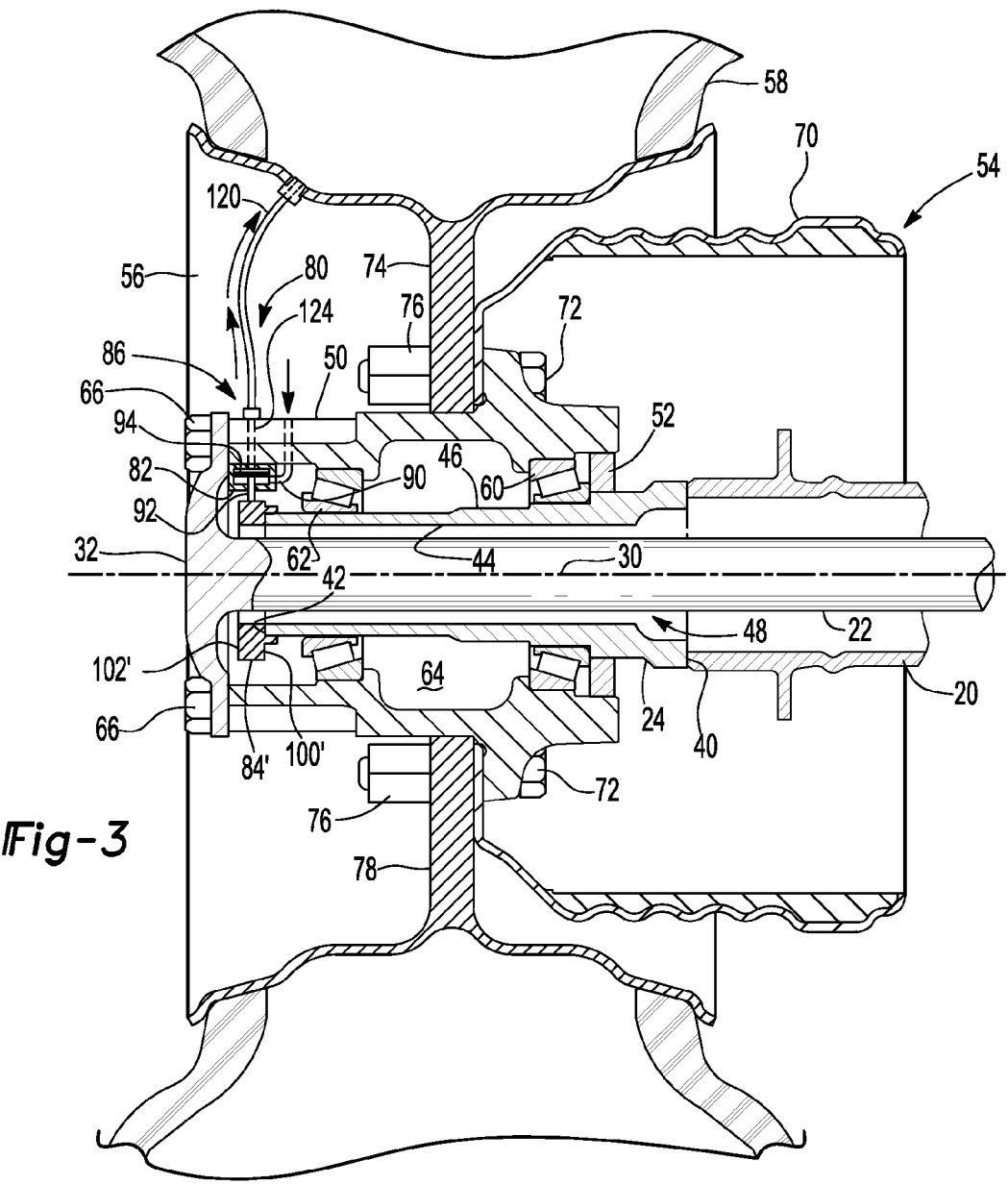
FIG. 3 is a section view of another embodiment of a wheel end assembly having a tire inflation system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a pump 82, a pump actuating member 84, and a gas supply subsystem 86.

The pump 82 may be configured to pressurize and supply a volume of a pressurized gas or pressurized gas mixture, like air or nitrogen. The pump 82 may be disposed on the vehicle and may provide a pressurized gas at a pressure that may be greater than or equal to a desired inflation pressure of a tire 58. As such, the pump 82 may inflate a tire 58 or maintain a desired tire pressure. The pump 82 may be of any suitable type. For example, the pump 82 may be a reciprocating positive displacement pump like a piston pump, a diaphragm pump, or the like. The pump 82 may be configured to provide fixed or variable displacement. A variable displacement pump may adjust the volume and/or flow rate of pressurized gas that is output. The pump displacement may be adjusted electrically, such as with the control system, and/or mechanically, such as via pressure feedback, and may reduce parasitic losses or energy consumption when the pump is not in use or is supplying less pressurized gas. In addition, gas pressure may be controlled passively with a calibrated relief valve in one or more embodiments.

The pump 82 may be disposed proximate the wheel end assembly 26 and may be configured to rotate about the axis 30. As such, the pump 82 may be disposed proximate and may rotate with the axle shaft 22, axle flange 32, and/or hub 50 in one or more embodiments. Rotation of the pump 82 about the axis 30 may cause the pump 82 to output pressurized gas as will be discussed in more detail below. The pump 82 may be spaced apart from and may rotate with respect to the spindle 24. In FIGS. 1 and 3, the pump 82 is generally disposed between the axle flange 32 and the second end surface 42 of the spindle 24. In at least one embodiment, the pump 82 may include an inlet 90, a pump shaft 92, and a displacement member 94.

The inlet 90 may receive a gas or gas mixture to be pressurized by the pump 82. The inlet 90 may extend through a housing of the pump 82. The inlet 90 may be disposed in the cavity 64 of the wheel end assembly 26 as shown in FIG. 1 or may extend outside the cavity 64 as shown in FIG. 3. The air or gas supplied to the pump 82 may be somewhat shielded from environmental contaminants outside the wheel end assembly 26 when disposed in the cavity 64. The air or gas supplied to the pump 82 may not be exposed to lubricant in the cavity 64 when disposed outside the cavity 64. The inlet configurations in FIGS. 1 and 3 may be interchanged in one or more embodiments.

The pump shaft 92 may extend from the housing of the pump 82 and may have a first end and a second end. The first end of the pump shaft 92 may be configured to engage the pump actuating member 84. The second end of the pump shaft 92 may be disposed opposite the first end and may be configured to engage the displacement member 94.

The pump shaft 92 may be provided in various orientations. For example, in FIG. 1, the pump 82 is disposed proximate the axle flange 32 and is oriented such that the pump shaft 92 faces inboard or toward the axle housing 20. In such an embodiment, the pump shaft 92 may extend substantially parallel to the axis 30. In FIG. 3, the pump 82 is disposed proximate the hub 50 and is oriented such that the pump shaft 92 faces toward the axis 30. In such an embodiment, the pump shaft 92 may extend radially with respect to the axis 30.

The displacement member 94 may move in a reciprocating or back-and-forth motion. In one or more embodiments, the displacement member 94 may make one complete stroke per revolution of the pump 82 about the axis 30 (e.g., move from and return to an initial position once per revolution). A biasing member (not shown) such as a spring may be provided with the pump 82 to bias the displacement member 94 and the pump shaft 92 toward the pump actuating member 84. The force exerted by the biasing member may keep the pump shaft 92 in continuous engagement with the pump actuating member 84 as the pump 82 rotates with the axle shaft 22 about the axis 30.

The pump actuating member 84 may be disposed proximate the spindle 24. The pump actuating member 84 may actuate the shaft 92 and the displacement member 94 when the pump 82 rotates about the axis 30. As such, the pump 82 may pressurize gas received from the inlet 90 and output pressurized gas. The pump actuating member 84 may have a ring-like configuration and may extend continuously around the axis 30 and external surface 46 of the spindle 24. In addition, the pump actuating member 84 may be fixedly disposed on the spindle 24. As such, the pump actuating member 84 may remain in a stationary position with respect to the spindle 24 when the axle shaft 22 rotates about the axis 30.

The pump actuating member 84 may be provided in various configurations. The pump actuating member 84 may extend continuously around the spindle 24 and the axis 30 in one or more embodiments.

Referring to FIGS. 1 and 2, the pump actuating member 84 may include a first surface 100, a second surface 102, and a mounting hole 104. In FIG. 2, the pump actuating member 84 is rotated 90° with respect to the position shown in FIG. 1.

The first surface 100 may face toward the second wheel bearing 62. The first surface 100 may extend substantially perpendicular to the axis 30 in one or more embodiments.

The second surface 102 may be disposed opposite the first surface 100. The second surface 102 may face toward the pump 82 and may be configured to engage the pump shaft 92. The second surface 102 may be substantially planar in one or more embodiments. In addition, the second surface 102 and may be disposed at an angle, or in a non-perpendicular orientation with respect to the axis 30 as is best shown in FIG. 2. As such, the position of the second surface 102 that engages the pump shaft 92 may vary as the pump 82 and pump shaft 92 rotate about the axis 30 and the pump shaft 92 moves along the second surface 102. The positioning of the second surface 102 may be best understood with reference to a first surface 100 that is disposed substantially perpendicular to the axis 30 as is shown in FIG. 2. In FIG. 2, the distance from the first surface 100 to the second surface 102 varies at a common or constant radial distance from the axis 30. For instance, the distance between the first surface 100 and the second surface 102 may vary between a maximum distance, designated $D_1$, and a minimum distance, designated $D_2$. As such, the pump shaft 92 and displacement member 94 may be fully advanced or actuated to a maximum distance from the first surface 100 proximate position $D_1$. Similarly, the pump shaft 92 and displacement member 94 may be fully retracted or actuated a maximum distance toward the first surface 100 proximate position $D_2$. Thus, the pump actuating member 84 may actuate the pump 82 when the pump 82 rotates about the axis 30.

The mounting hole 104 may extend from the first surface 100 to the second surface 102. The mounting hole 104 may receive the spindle 24 and may be coaxially disposed with the axis 30.

Figure 4:
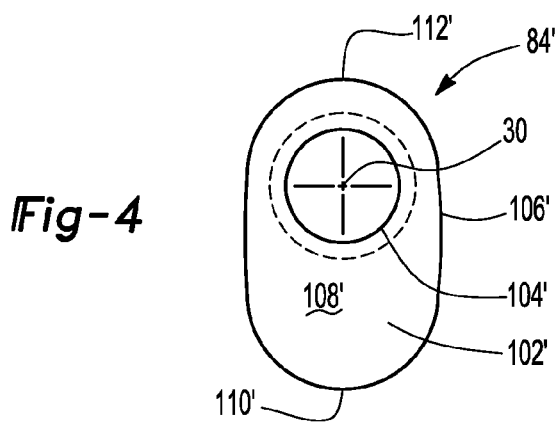
FIG. 4 is an end view of a pump actuating member shown in FIG. 3.

Referring to FIGS. 3 and 4, another example of a pump actuating member 84' is shown. The pump actuating member 84' may include a first surface 100', a second surface 102', a mounting hole 104', and an outer surface 106'.

The first surface 100' may face toward the second wheel bearing 62. The first surface 100' may extend substantially perpendicular to the axis 30 in one or more embodiments.

The second surface 102' may be disposed opposite the first surface 100'. The second surface 102' may face toward the pump 82 and may be configured to engage the pump shaft 92.

The mounting hole 104' may extend from the first surface 100' to the second surface 102'. The mounting hole 104' may receive the spindle 24 and may be coaxially disposed with the axis 30.

The outer surface 106' may extend from the first surface 100' to the second surface 102'. The outer surface 106' may be disposed opposite the mounting hole 104' and may be configured to engage the pump shaft 92. In addition, the outer surface 106' may extend along a curved or arcuate path and may extend substantially parallel to the axis 30 in one or more embodiments.

The distance from the axis 30 to the outer surface 106' may not be constant. More specifically, the pump actuating member 84' may have a lobe 108' that may make the pump actuating member 84' asymmetrical with respect to the axis 30. As such, the lobe 108' may be offset from the axis 30 and may at least partially define the outer surface 106' such that a distance from the axis 30 to the outer surface 106' increases or is greatest proximate the lobe 108'. For instance, the lobe 108' may have a nose 110' that may define a maximum radial distance from the axis 30 to the outer surface 106'. A tail 112' may define a minimum radial distance from the axis 30 to the outer surface 106'. The nose 110' may be disposed opposite the tail 112' in one or more embodiments. As such, the position of the outer surface 106' that engages the pump shaft 92 may vary as the pump 82 and pump shaft 92 rotate about the axis 30 and the outer surface 106'. As such, the pump shaft 92 and displacement member 94 may be fully advanced or actuated to a maximum distance from the axis 30 proximate the nose 110' and may be fully retracted or actuated a maximum distance toward the axis 30 proximate the tail 112'. Thus, the pump actuating member 84' may actuate the pump 82 when the pump 82 rotates about the axis 30 and the pump actuating member 84'.

The gas supply subsystem 86 may fluidly connect the pump 82 to the tire 58. The gas supply subsystem 86 may include one or more conduits 120, such as a hose, tubing, pipe, or combinations thereof. The conduit 120 may receive pressurized gas from the pump 82 and may supply pressurized gas to the tire 58. In addition, one or more valves may be associated with or provided with the conduit 120 to enable or disable the flow of the pressurized gas from the pump 82 to one or more tires 58. In addition, a check valve may be provided to inhibit backflow of pressurized gas from the tire to the pump 82. The flow of pressurized gas is represented by the arrows in the conduits in FIGS. 1 and 3.

The conduit 120 may be routed from the pump 82 to the tire 58 in various ways. In FIG. 1, the conduit 120 is routed through an axle flange hole 122 that may be configured as a through hole in the axle flange 32. As such, the conduit 120 may be routed around the perimeter of the axle flange 32 to the tire 58. In FIG. 3, the conduit 120 is routed through a hub hole 124 that may be configured as a through hole in the hub 50. The conduit routing configurations in FIGS. 1 and 3 may be interchanged in one or more embodiments.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A tire inflation system comprising:
a spindle that extends along an axis;

a wheel end assembly that is rotatably disposed on the spindle and configured to rotate about the axis and with respect to the spindle, wherein the wheel end assembly receives an axle shaft having an axle flange;

a pump actuating member that is disposed proximate the spindle;

a pump that is disposed proximate the axle flange and that rotates about the axis with the wheel end assembly, wherein the pump actuating member actuates the pump when the pump rotates about the axis, thereby causing the pump to output a pressurized gas; and a conduit that supplies the pressurized gas from the pump to a tire.

2. The tire inflation system of claim 1 wherein the pump is a reciprocating positive displacement pump.

3. The tire inflation system of claim 1 wherein the pump engages the axle flange.

4. The tire inflation system of claim 1 wherein the pump is disposed between the axle flange and the spindle.

5. The tire inflation system of claim 4 wherein the pump is disposed on the axle flange and does not engage the spindle.

6. The tire inflation system of claim 1 wherein the wheel end assembly further comprises a hub that is rotatably disposed on the spindle, wherein the pump is disposed on the hub.

7. The tire inflation system of claim 1 wherein the pump actuating member extends continuously around an external surface of the spindle.

8. The tire inflation system of claim 1 wherein the pump includes a displacement member that moves in a reciprocating motion, wherein the displacement member completes one stroke per revolution of the pump about the axis.

9. A tire inflation system comprising:
a spindle having a hole;
an axle shaft that extends through the hole and that is configured to rotate about an axis with respect to the spindle, wherein the axle shaft includes an axle flange disposed proximate a distal end;
a pump actuating member that is fixedly disposed on the spindle and that extends around the spindle;
a pump that is disposed proximate the axle flange and rotates about the axis with the axle shaft, wherein the pump actuating member actuates the pump when the pump rotates about the axis, thereby causing the pump to output a pressurized gas; and
a conduit that supplies the pressurized gas from the pump to a tire.

10. The tire inflation system of claim 9 wherein the pump further comprises a pump shaft that engages the pump actuating member, wherein the pump shaft extends substantially parallel to the axis.

11. The tire inflation system of claim 9 wherein the pump actuating member includes a first surface, a second surface disposed opposite the first surface, and a mounting hole that extends from the first surface to the second surface, wherein the spindle is disposed in the mounting hole.

12. The tire inflation system of claim 11 wherein the second surface faces toward the pump and is disposed at an angle with respect to the axis.

13. The tire inflation system of claim 12 wherein the second surface is substantially planar and the first surface extends substantially perpendicular to the axis.

14. The tire inflation system of claim 9 wherein the axle flange has an axle flange hole and wherein the conduit extends through the axle flange hole.

15. A tire inflation system comprising:
a spindle that extends along an axis;
a hub that is rotatably disposed on the spindle and configured to rotate about the axis, wherein the hub has a hub hole;
a pump actuating member that is fixedly disposed on the spindle and that extends around the spindle;
a pump that is disposed proximate the hub and rotates about the axis with the hub, wherein the pump actuating member actuates the pump when the pump rotates about the axis, thereby causing the pump to output a pressurized gas; and
a conduit that extends through the hub hole and supplies the pressurized gas from the pump to a tire.

16. The tire inflation system of claim 15 wherein the pump further comprises a pump shaft that engages the pump actuating member, wherein the pump shaft extends radially with respect to the axis.

17. The tire inflation system of claim 15 wherein the pump actuating member includes a first surface, a second surface disposed opposite the first surface, and a mounting hole that extends from the first surface to the second surface, wherein the spindle is disposed in the mounting hole.

18. The tire inflation system of claim 17 wherein the pump actuating member has a lobe that is offset from the axis and that partially defines an outer surface that extends from the first surface to the second surface, wherein the outer surface engages the pump and is configured such that a distance from the axis to the outer surface increases proximate the lobe.

19. The tire inflation system of claim 18 wherein the outer surface extends substantially parallel to the axis.

20. The tire inflation system of claim 15 wherein the pump is disposed on an axle flange of an axle that extends through the spindle.

* * * * *